United States Patent [19]

Bennett et al.

[11] Patent Number: 5,560,892
[45] Date of Patent: Oct. 1, 1996

[54] APPARATUS SYSTEM FOR BENEFICIATION OF KISH GRAPHITE

[75] Inventors: George W. Bennett, Orléans; Maxime Leduc, Longueuil; Jean-Guy St-Hilaire, St. Antoine; Christian Garceau, St. Gregoire, all of Canada

[73] Assignee: Indresco Inc., Dallas, Tex.

[21] Appl. No.: 425,296

[22] Filed: Apr. 20, 1995

Related U.S. Application Data

[62] Division of Ser. No. 312,341, Sep. 26, 1994, abandoned.

[51] Int. Cl.$^6$ .............................. B01D 11/02; C01B 31/04
[52] U.S. Cl. ..................... 422/267; 422/273; 422/292; 423/448; 423/460; 423/461
[58] Field of Search .................................. 423/448, 460, 423/461; 422/267, 273, 292

[56] References Cited

U.S. PATENT DOCUMENTS

| | | | |
|---|---|---|---|
| 3,932,596 | 1/1976 | Rohatgi | 423/448 |
| 5,364,441 | 11/1994 | Worner | 75/10.1 |

OTHER PUBLICATIONS

Ema et al, "New Recovery Process of Kish Carbon" Proc. Sixth Int. Iron and Steel Congress, Nagoya, Japan 1990 (no month).

Kowa Seiko Co., Ltd. et al "High Purity Kish Graphite", New Materials Development in Japan, 1985, pp. 73–74 (no date).

Wakamatsu et al, "Flotation of Graphite", Minerals Engineering, vol. 4, Nos. 7–11, 1991, pp. 975–982 (no month).

"Graphite–From–Kish Process" Bureau of Mines Preliminary Report No. 415, Jan. 1993.

Landreth et al "The Bench Scale Testing of a Process to Recover Synthetic Flake Graphite and Iron Oxide from Kish", Jun. 13–18, 1993.

"Flotation of Graphite", Wakamatsu et al Minerals Engineering, vol. 4, No. 7–11, pp. 975–982.

"New Recovery Process of Kish Carbon", Proc. 6th Intrnl Iron & Steel Congress, 1990, Nagoya ISIJ.

"The Bench Scale . . . Kish", Landreth et al, Air & Waste Management, Jun. 13–18, 1993.

Graphite—From Kish Proces—Burea of Mines, No. 415 Jan. 1993.

Primary Examiner—N. Bhat
Attorney, Agent, or Firm—John L. Sigalos

[57] ABSTRACT

A apparatus system is disclosed for time beneficiation of kish to produce coarse high purity graphite wherein a concentrate containing at least about 90% carbon is formed, treated with a dilute acid solution, and the pulp then subjected to an adjuvant-assisted attrition to form a novel synthetic flake graphite of 99+ wt. % carbon with at least 70% of the mass retained on +100 mesh, and an overall recovery of graphitic carbon from the feed of greater than 85% by weight.

5 Claims, 2 Drawing Sheets

APPARATUS SYSTEM FOR BENEFICIATION OF KISH GRAPHITE

This application is a division of application Ser. 08/312,341, filed Sep. 26, 1994, abandoned in favor for File Wrapper Continuation 08/554,249 filed Nov. 8, 1995, now pending.

BACKGROUND OF THE INVENTION

This invention relates to a method of beneficiating kish graphite to high purity levels in an economic manner without undue destruction of the coarse graphite flakes.

Graphite, particularly flake graphite, finds use in many applications, including refractories, as a coating material in foundries, in brake linings, batteries, carbon brushes, pencils, propellants, as a precursor for expandable graphite, as a lubricant, and in other areas.

In refractories, flake graphite imparts high thermal conductivity and improved slag resistance. At operating temperatures, residual impurities are detrimental to the high temperature stability of the flakes. Because of this there is a tendency in refractory applications to use flake graphite of higher purity. For example, U.S. Pat. No. 4,912,068 describes the significant increase in hot strength made possible by using 99% pure flake graphite in magnesia-carbon brick. Flake graphite sold to certain battery markets requires a purity level of at least 99.9% carbon. Flake graphite sold to the expandable graphite market requires a purity of at least 96%. Large, high purity flakes command a higher price and are becoming increasingly desired. All of these tendencies are driving graphite producers to find new methods of producing high purity flake graphite. Further, it is important to note that the United States is totally dependent on foreign sources for this material. Therefore, the desire exists to find a suitable domestic source of this important raw material.

Flake graphite occurs naturally as flakes disseminated in metamorphosed siliceous or lime-rich sediments such as limestone, gneiss, and schist. In unweathered deposits it is difficult to liberate and separate the flakes from the ore without destroying their size. A number of processes are utilized to upgrade flake graphite to high purity levels, that is above 96% carbon, without significantly decreasing the size of the flakes.

In addition to naturally occurring graphite, there is a type of graphite referred to as "kish" graphite.

"Kish" is a general term for waste that forms during the iron production process and during the initial steelmaking process. It contains graphite in a flake form, iron, lime-rich slag, and other materials. Efforts have been made to recover flake graphite from kish and it is this graphite that has been now termed "kish graphite".

To date, efforts to improve the purity of kish graphite and still retain its coarse size have not been commercially satisfactory. They have generally followed the accepted procedures utilized for upgrading graphite-containing ores which require the use of multi-step chemical leaching. Such a process is described in the *Bureau Of Mines preliminary Report No.* 415 of Jan. 1993 and the extension of this work by the joint effort of Inland Steel Industries and Asbury Graphite Mills, Inc. which was presented at the 86th Annual Meeting of the Air & Waste Management Association on Jun. 13–18, 1993. These techniques are able to upgrade the purity of the graphite to 95–96% carbon, but at significant cost due to the numerous leaching steps required. Further upgrading of the kish graphite to 98 or 99% purity has also been reported in the Bureau of Mines report noted above, but, again, with multiple steps using strong acids bearing the attendant cost of having all of the safety features involved for handling of the acids, recovering, and disposing of the same.

In short, it has not been possible to economically beneficiate kish graphitic to 99% graphitic carbon content.

SUMMARY OF THE INVENTION

It has been discovered that flake graphite from kish can be economically upgraded to 99%+ graphitic carbon content with an acceptable rate of recovery and minimal destruction of flake size.

Briefly, the present invention comprises the method of recovering high purity flake graphite from kish, comprising first forming a concentrate, screening said kish graphite concentrate to preferably retain about a +200 mesh fraction, light milling of said fraction, screening said milled fraction to preferably retain a +200 mesh fraction, and mixing said fraction in a dilute acid to form a weakly acidic pulp, subjecting said pulp to attrition, neutralizing said acidic pulp and recovering said kish graphite by flotation.

The invention also comprises the resultant graphite product and apparatus system for effecting such method as hereinafter more fully described.

BRIEF DESCRIPTION OF THE DRAWINGS

FIG. 1a and 1b are a flow diagram depicting time method and apparatus system of the instant invention.

DETAILED DESCRIPTION

Figure 1A:
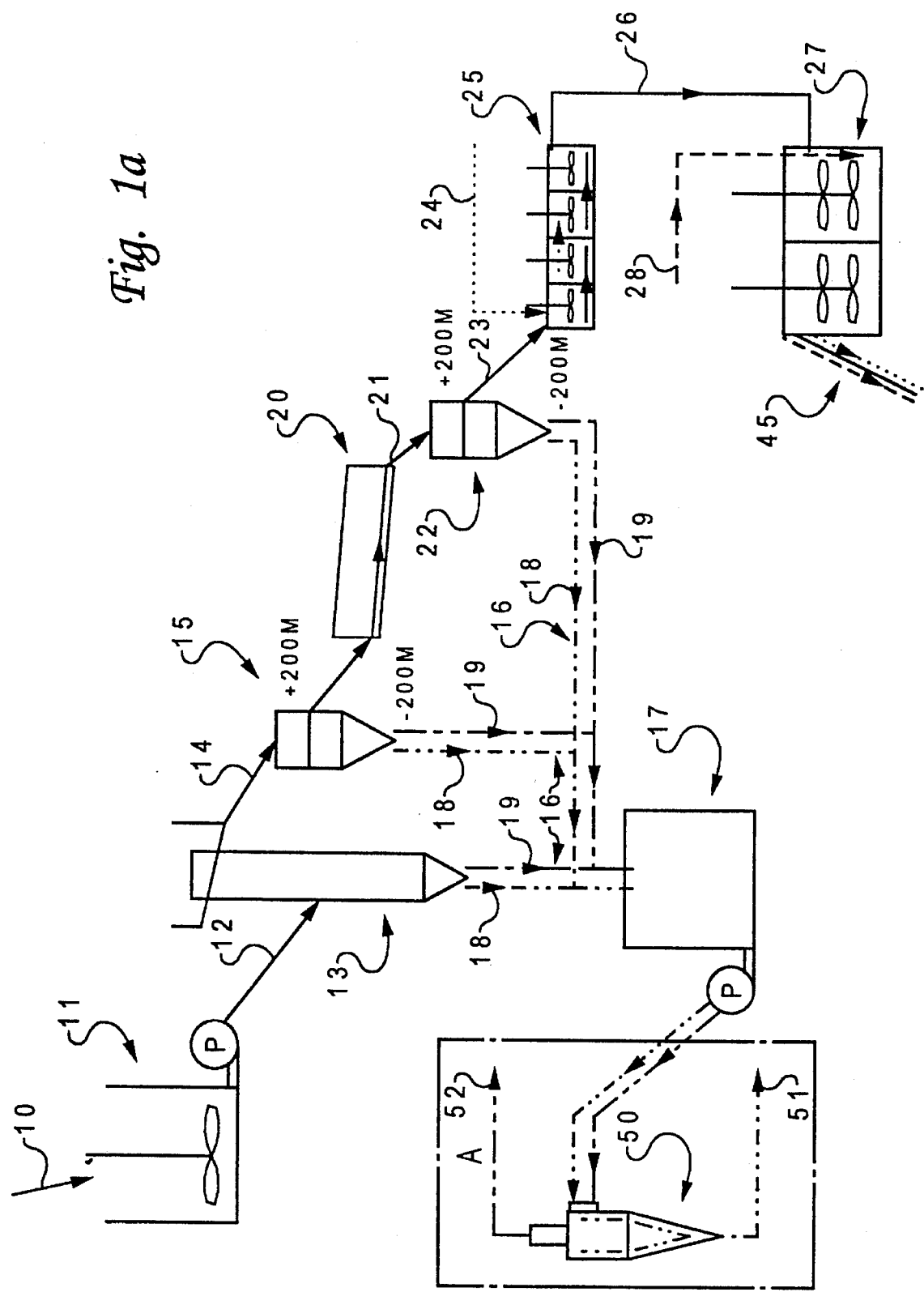
Figure 16:
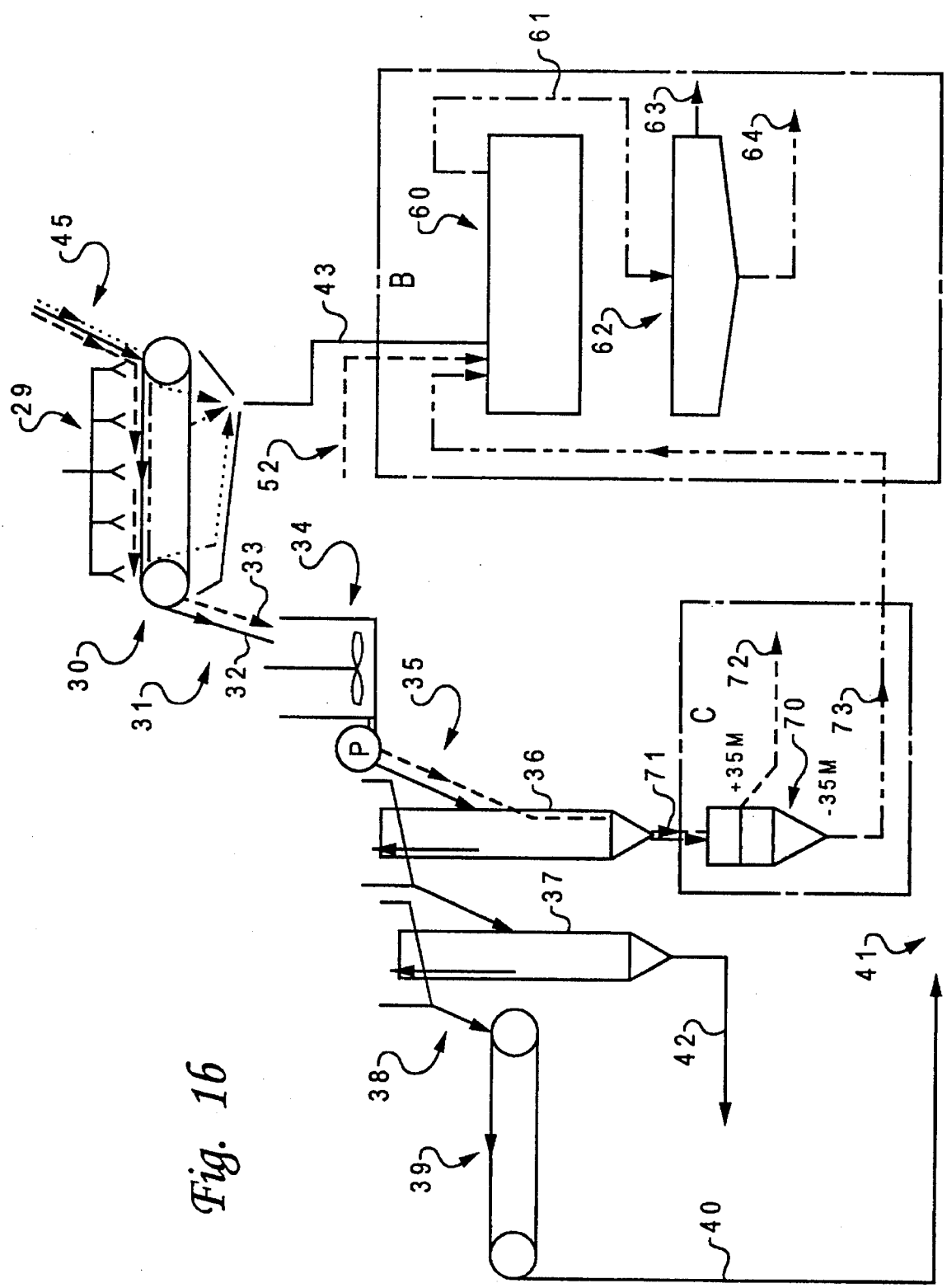

It will be understood at the outset that the instant invention is directed to the beneficiation of kish graphite and the term "graphite" when used alone herein refers to tile fact that the starting material is, in fact, kish graphite. Moreover, as has been noted, "coarse" flake graphite is most desired because of its higher value and as used herein that term is applied to graphite in which the bulk, at least 50%, most preferably at least about 70%, or more, by weight thereof is reported on a +100 mesh screen. The mesh sizes referred to herein are Tyler standard.

The essential steps of the instant invention in producing high purity flake graphite from kish involve treatment with a dilute acid followed by attrition milling. Other steps in the process include concentration, flotation, and the use of pebble milling. However, the ability to obtain high purity kish graphite is by combining a dilute acid solution with kish graphite and then subjecting the same to attrition. This facilitates the preparation of coarse high purity flake graphite while overcoming the disposal problems of concentrated acid.

The process and apparatus system are illustrated in the accompanying drawings in which the various pumps for moving the material are indicated by a "p" in a circle. Raw kish 10 obtained from a steel mill (which has previously been concentrated to any percent desired of kish graphite using conventional beneficiation techniques such as flotation) is added to a conventional conditioning tank 11 where it is admixed with. conventional flotation aids, such as #2 fuel oil and MIBC (methyl isobutyl carbinol). The percent purity of the kish graphite at this point is not critical and the concentration of the feed is dictated by the economics of the operation and the particular source of the kish. The invention will be described in conjunction with a kish concentrate containing 35% graphitic carbon. If needed, and as shown in the drawing, the graphite concentrate 12 can be further concentrated in rougher flotation cell 13, to form a concentrate 14 containing greater than 70% graphitic carbon.

The resultant concentrate 14 as an overflow from cell 13 is then passed to a wet screen 15 of any conventional type used in ore handling to collect a +200 mesh fraction. The tails 16 from cell 13 and screen 15 are combined in tails sump 17 for further treatment as described later herein. Tails 16 consist of iron 18, which can be recovered in Circuit A for reuse and remaining tail material 19 which contains large amounts of lime.

The resulting +200 mesh graphite fraction is then subjected to light milling, such as in a conventional pebble mill 20, but under conditions such as to minimize degradation of the coarse graphite flakes. It is preferred to use small low density, non-metallic, spherical or short axis cylindrical grinding media, suitably one-half inch diameter available commercially as Cylpebs. Such milling of the +200 mesh graphite concentrate in mill 20 serves to effectively liberate the flakes from the kish so the resulting discharge from mill 20 may be easily concentrated to a level of 95% graphitic carbon. Importantly, the use of the small size grinding media minimizes the destruction of coarse flakes with a suitable milling time being five to twenty minutes.

The ground flake graphite concentrate 21 is again screened on any conventional wet screen 22 to collect a +200 mesh fraction 23. The iron 18 and remaining −200 mesh tails 19 that form the underflow from screen 22 are added to sump 17 for further treatment.

concentrate 23 is then admixed with a dilute acid 24 in a conventional mixing tank 25. Although only one mixing tank is depicted, to ensure adequate acid treatment of all the material, two or more connected tanks can be used.

An important feature of the instant invention is that the acid need not be concentrated and, in fact, can be very dilute, at a concentration on the order of less than about 7.5%. It is preferred to use hydrochloric acid because of its ease of handling and lower cost. While not completely understood, it is believed that the weak acid functions simply to soften the cement-like bonds of the oxides attached to the graphite flakes.

In order to therefore best utilize the weak acid, it was determined that this weak acid treatment phase should take place only after the concentrate had been physically cleaned to the greatest possible level. This not only acts to decrease the gangue material available to react with the acid and thereby decrease the acid requirement and/or its strength significantly, but also to enable the acid to get to the interface between the gangue and the platelets and most effectively liberate high purity graphite with minimal destruction of the kish graphite particles. The residence time of the +200 mesh fraction in the mixing tank with the acid will vary, depending upon feed grade and desired product grade.

The acidic slurry or pulp 26 is subjected to attrition, preferably with the addition of an attrition adjuvant (attritants) 28 in attrition device 27. Suitable attrition adjuvants are abrasive mineral sands, graphitic ore, or mixtures thereof. The abrasive mineral sands, such as silica sand, are preferred, particularly those having a specific gravity less than 3.0 and a mesh size between 10 and 40 mesh, most preferably one having 50% 16 mesh and 50% 24 mesh.

As used herein, the term "attrition" means a rubbing or abrasive action created by the individual graphite flakes or flakes and attritants impinging and rubbing against each other in an agitated aqueous pulp with sufficient force to physically dislodge the surface impurities. As previously noted, an attrition adjuvant 28 is preferably utilized to facilitate attrition, thereby minimizing the time required to liberate the flakes to 99+wt. % purity with only minimal size reduction of coarse flakes.

Such attrition can be satisfactorily carried out using commercially available attrition cells such as a WEMCO attrition scrubber or a DENVER attrition scrubber. Most preferably, attrition cells having at least one set of opposing pitched impellers are used. Such machines are typically used to scrub glass-grade sand, to remove clays from iron ore, and to break up weakly bonded agglomerates. For such cleaning and deagglomeration uses the machines do not contain adjuvants.

The specific optimum conditions, such as impeller speed, pulp solids concentration, attrition time and the like, can be readily determined for any kish flake graphite concentrate and attrition machine combination by routine experimentation following the detailed description set forth herein. It will be evident that the optimum conditions are readily determined by noting the purity of the flake graphite obtained and the percentage of different mesh size flakes preserved after attrition. The point at which both are at a maximum is the optimum. The pulp solids, impeller speed, attrition time and the like can be varied until such optimum is obtained.

Attrition milling may be carried out at ambient temperature with the attrition time varying, dependent on such factors, as noted above. The acidic pulp slurry is preferably combined with the attrition adjuvant in a weight ratio of concentrate, attrition adjuvant, acidic water of about 1:2:2.5. This results in a slurry of 55% solids content. This ratio can vary to give a slurry that ranges from about 20% to 80% solids. The particular solids content is dictated by ease of liberation, the feed grade, and the desired purity level of the final product which can be determined by routine experimentation.

After the attrition has been completed, the attrited material 45 is subjected to a washing/diluting water spray 29 in any device such as a conventional screen belt separator 30 in order to remove the acid and to remove all the −200 mesh gangue material. The result is a flake graphite stream 31 containing graphite concentrate 32, attrition adjuvant 33, and +200 mesh gangue. Stream 31 is preferably subjected to two flotation cycles.

Stream 31 is first placed in a conventional conditioning tank 34 and admixed with conventional reagents used in floating ores, such as, again, #2 fuel oil and MIBC. The conditioned concentrate stream 35 is then passed through conventional flotation cells 36 and 37 where the overflow 38 containing the concentrated flake graphite is first treated on conventional filter 39 to remove as much liquid as possible and filtered concentrate 40 containing 99% graphitic carbon is then passed to conventional dryers, screens, and packaging apparatus 41, which are not shown.

Tails 42 from cell 37 are returned to mill 20 for further processing.

The acidic solution and tails 43 recovered from filter 30 are conveyed to the neutralization and waste disposal circuit B.

The drawings also illustrate circuits A, B and C that can be utilized and which add to the economies of the instant process. The first is circuit A involving treatment of the tails from the initial rougher column 13 and from wet screens 15 and 22. The combined tails are rich in iron and are fed from sump 17 to a conventional separator 50, such as a Whirlsizer, to produce a high gravity iron-rich underflow concentrate 51 that can be reused. The overflow 52, a material high in lime, is combined with filtrate 43 to neutralize the acid and further treated in Circuit B which provides water for use in the process and extracts solids which are landfilled.

Circuit B contains neutralizing tank 60, into which feeds 43, 52, and 73 are fed, and may need alkali material added thereto to guarantee a neutral effluent. The neutralized feed 61 from tank 60 is conveyed to a conventional thickener 62 which removes water 63 for return to the process water stream and produces a higher percentage solids tail 64, which is landfilled.

It will be evident that by using the weak concentration of acid, very little neutralization is required. Further, by providing for recovery of the iron-rich concentrate in the Whirlsizer, one is able to scavenge the maximum amount of iron from the process.

Auxiliary Circuit C comprises wet screen 70 which receives the adjuvant and tails 71 from flotation column 36. Screen 70 is sized to separate the attrition adjuvant (sand) 72 which is returned for use in the attrition device 27 and, as noted above, the tails 73 are combined with stream 43 from the acid filter 30 and stream 52 from Whirlsizer 50 and placed in neutralizing tank 60.

It is these unique and essential steps and apparatus combination that enable the economic recovery of the desired 98 and higher percent carbon coarse kish graphite flakes. As has been discussed above, previously it has been possible to obtain a 95% carbon graphite from kish, but this has been at significant cost in time and with the use of concentrated acids. Moreover, as noted, it was not possible to get reasonable recovery with carbon concentration above 95%.

This process removes essentially all the useful materials in the kish, maintains the coarseness of the kish graphite while permitting high purity at low cost, and minimizes the amount of kish that is disposed in landfills.

The invention will be further described in connection with the following examples which are set forth for purposes of further illustration only.

EXAMPLES 1 TO 4

A series of four different tests were carried out on the same kish utilizing the apparatus system depicted in the drawings to determine optimum milling conditions. The kish contained 37% carbon and was concentrated to ~70–75% carbon by rougher flotation and then fed to a pebble mill. Each of the four concentrated fractions was separately fed to the same mill. Milling time varied from 5 to 20 minutes. Each of the milled fractions was then tested to determine the graphitic carbon content and total carbon recovered. The results were as follows:

| Example No. | Milling Time (min) | % Graphitic Carbon (Cg) |
|---|---|---|
| 1 | 5 | 93.1 |
| 2 | 10 | 95.0 |
| 3 | 15 | 94.9 |
| 4 | 20 | 95.5 |

Most importantly, there was very little destruction of the coarse graphite flakes as the milling time increased from 5 to 20 minutes. The results were as follows:

| Example No. | Mesh Size Percentages Before Milling | | | | Mesh Size Percentages After Milling | | | |
|---|---|---|---|---|---|---|---|---|
| | +48 | +80 | +100 | +200 | +48 | +80 | +100 | +200 |
| 1 | 34.4 | 33.6 | 7.5 | 24.5 | 33.2 | 31.7 | 7.0 | 21.2 |
| 2 | 36.2 | 31.3 | 8.8 | 24.1 | 35.2 | 30.1 | 7.9 | 21.9 |
| 3 | 33.7 | 33.3 | 7.6 | 25.4 | 32.6 | 32.0 | 7.2 | 23.2 |
| 4 | 33.2 | 32.8 | 7.7 | 26.2 | 32.1 | 31.5 | 7.3 | 24.5 |

EXAMPLES 5 AND 6

In these tests the same 37% Cg kish was concentrated by roughing to a ~+70% Cg concentrate, but it was subjected to only mechanical (physical) enhancement.

One fraction (Example 5) was milled for 5 minutes, wet screened on a 200 mesh screen with the through's rejected, and the +200 mesh fraction, which was 89.8% graphitic carbon, was attritioned for 5 minutes at 2,700 r.p.m.'s without first being treated with dilute acid. The attritioned concentrate was then subjected to two flotation cleanings and the resultant +200 mesh material analyzed. The kish graphite recovery was ~75% and the graphitic carbon content was 97 9% with all +200 mesh graphite at +98%.

For example 6, the same concentrate and process were used except that a 200 mesh screening was substituted for the two steps of flotation and the attrition time increased. to 10 minutes. There was no improvement in carbon content over Example 5, but the coarse flake graphite recovery was decreased from 18.7% to 11.5%.

These tests show that attrition alone is inadequate to achieve +99% Cg coarse flake graphite from kish.

EXAMPLE 7

A test was made in accord with the present invention in which a crude kish assaying at 33.6% Cg was subjected to rougher concentration to form a 72.4% Cg concentrate.

A +200 mesh fraction was obtained by wet screening and such fraction was admixed with an aqueous solution of (5%) HCl for about 10 minutes. The acidic pulp was then attritioned for 5 minutes in an attrition device whose paddles operated at 2100 r.p.m. Sand was used as an attrition adjuvant with the concentrate/adjuvant ratio being 1:2 and the solids content 55%.

After attrition, the acid pulp was neutralized, subjected to two flotations, the flake graphite recovered and tested.

The flake graphite had a purity of 99.3% graphitic carbon, of which 75% was retained on +100 mesh. The final recovery of this test was 87% of the graphitic carbon from the feed.

Thus, the instant method and apparatus system will generate a +200 mesh kish graphite of 99+ wt. % carbon purity with 70% or more of the mass retained on +100 mesh, and an overall recovery of graphitic carbon from the feed of greater than 85%. This is a highly favorable result and of great commercial significance, particularly with respect to treating what has been heretofore considered a waste material.

It will be understood that kish from iron or steelmaking processes can vary widely, but operating within the teachings of the present invention, one skilled in the art can determine the operative and optimum conditions to recover the flake graphite from any kish by routine experimentation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus system for beneficiating kish to produce high purity flake graphite having 99%+ graphitic carbon content comprising means to concentrate a kish, first screening means operatively associated with said concentrating means to collect a first large particle size carbon fraction, milling means in communication with the first screening means to mill said large particle size carbon fraction, second screening means operatively associated with said milling means to separate said milled fraction into a second large particle size carbon fraction, mixing means in communication with said second screening means and means for introducing a dilute acid into said mixing means to form a pulp of the dilute acid and said second large particle size carbon fraction, attrition means in fluid flow communication with said mixing means and means for introducing a solid attrition adjuvant into said attrition means to attrit said pulp, means to receive and neutralize said attrited pulp, and means to recover the high purity flake graphite having 99%+ graphitic carbon content from said neutralized pulp.

2. The apparatus system of claim 1 wherein said first screening means is sized to provide a +200 mesh fraction.

3. The apparatus system of claim 2 wherein said second screening means is sized to provide a +200 mesh fraction.

4. The apparatus system of claim 3 wherein said means to recover the flake graphite from the neutralized pulp includes flotation means.

5. The apparatus system of claim 1, including means to recover iron from said kish operatively associated with means conveying fractions of the kish obtained prior to said mixing means which are not used to form an acidic pulp and attrited.

* * * * *